United States Patent [19]

Krambeck et al.

[11] Patent Number: 4,624,772
[45] Date of Patent: Nov. 25, 1986

[54] CLOSED REACTOR FCC SYSTEM WITH PROVISIONS FOR SURGE CAPACITY

[75] Inventors: Frederick J. Krambeck, Cherry Hill; Klaus W. Schatz, Skillman, both of N.J.

[73] Assignee: Mobil Oil Corporation, New York, N.Y.

[21] Appl. No.: 796,132

[22] Filed: Nov. 8, 1985

Related U.S. Application Data

[62] Division of Ser. No. 529,824, Sep. 6, 1983, Pat. No. 4,579,716.

[51] Int. Cl.$^4$ .................. C10G 57/00; C10G 11/18
[52] U.S. Cl. .................................. 208/95; 208/113; 208/161; 422/113; 422/147; 55/432
[58] Field of Search ............... 208/161, 113, 164, 153, 208/95; 422/113, 147; 55/432

[56] References Cited

U.S. PATENT DOCUMENTS

| | | | |
|---|---|---|---|
| 3,821,103 | 6/1974 | Owen et al. | 208/153 |
| 4,070,159 | 1/1978 | Myers et al. | 208/161 |
| 4,163,726 | 8/1979 | Wilson et al. | 55/432 |
| 4,385,985 | 5/1983 | Gross et al. | 208/113 |
| 4,394,349 | 7/1983 | Cartmell | 208/153 |
| 4,414,101 | 11/1983 | Smith et al. | 208/113 |
| 4,446,107 | 5/1984 | Buyan et al. | 55/432 |
| 4,579,716 | 4/1986 | Krambeck | 208/113 |

Primary Examiner—Andrew H. Metz
Assistant Examiner—Anthony McFarlane
Attorney, Agent, or Firm—Alexander J. McKillop; Michael G. Gilman; Dennis P. Santini

[57] ABSTRACT

A fluid catalytic cracking (FCC) apparatus and process comprising a reactor riser zone, a primary and a secondary cyclones, connected in series to the riser zone, and a stripping zone. The riser zone, the primary and the secondary cyclones, and the stripping zone, are placed within a single reactor vessel. The primary cyclone is connected to the reactor riser zone by an enclosed conduit which prevents random post-riser thermal cracking of the hydrocarbons after they exit the reactor riser zone. The conduit contains a trickle valve, or other means, to accommodate sudden increased surges of flow of the hydrocarbons and catalyst mixture.

22 Claims, 2 Drawing Figures

U.S. Patent Nov. 25, 1986 4,624,772
FIG. 1
FIG. 2
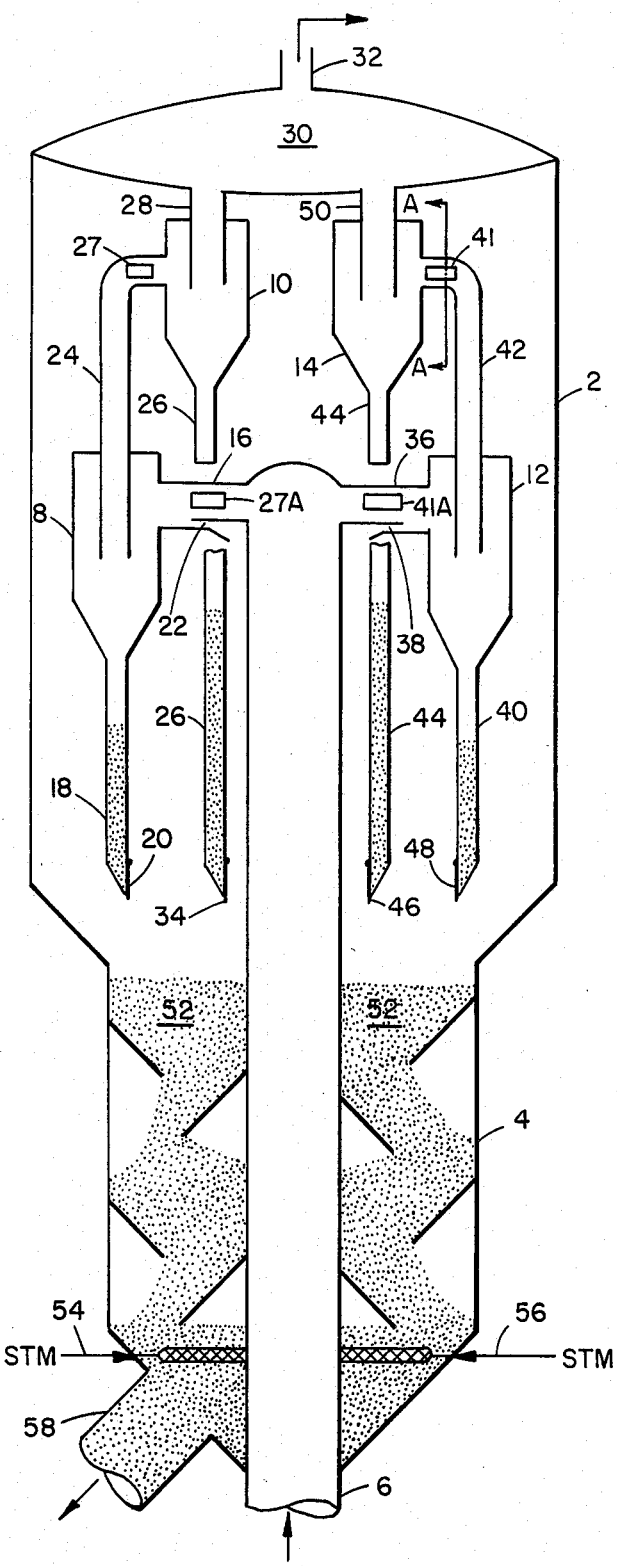
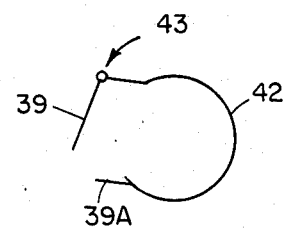

CLOSED REACTOR FCC SYSTEM WITH PROVISIONS FOR SURGE CAPACITY

CROSS-REFERENCE TO RELATED APPLICATION

This application is a division of application Ser. No. 529,824, filed Sept. 6, 1983 now U.S. Pat. No. 4,579,716.

BACKGROUND OF THE INVENTION

1. Field of the Invention

This invention relates to the separation of the catalyst phase from the gasiform phase in a fluidized catalytic cracking unit (FCC) reactor. More particularly, it relates to improvements in separating the catalyst phase from the gasiform phase, as the suspension comprising both phases is discharged from a riser conversion zone outlet, to minimize or substantially eliminate post-riser conversion zone cracking.

2. Description of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity.

Of particular concern in this field has been the development of methods and systems for separating gasiform products from fluidizable catalyst particles, particularly from a high activity crystalline zeolite cracking catalysts, under more efficient separating conditions so as to reduce the overcracking of conversion products and promote the recovery of desired products of a hydrocarbon conversion operation. However, present day cyclonic equipment often permits an undesired extended residence time of the product vapor within a large reactor vessel. This extended residence time causes a loss of the desired product yield of up to about 4 percent through non-selective thermal cracking. Recent developments in this art have been concerned with the rapid separation and recovery of entrained catalyst particles from gasiform products in a short contact time riser hydrocarbon conversion operation.

The hydrocarbon conversion catalyst usually employed in an FCC installation is preferably a high activity crystalline zeolite catalyst of a fluidizable particle size which is transferred in suspended or dispersed phase condition generally upwardly through one or more riser conversion zones providing a hydrocarbon residence time in each conversion zone in the range of 0.5 to about 10 seconds, and more usually less than about 8 seconds. High temperature riser hydrocarbon conversions of at least 1000° F. at 0.5 to 4 seconds hydrocarbon residence time in contact with the catalyst in the riser are desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the catalyst conversion step. The entrained hydrocarbons are subjected to further contact with the catalyst until they are removed from the catalyst by mechanical means and/or stripping gas in a separate catalyst stripping zone. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Various processes and mechanical means have been employed heretofore to effect rapid separation of the catalyst phase from the hydrocarbon phase at the termination of the riser cracking zone, to minimize contact time of the catalyst with cracked hydrocarbons.

Cartmell, U.S. Pat. No. 3,661,799, discloses a process for catalytic conversion of petroleum feedstocks wherein the fluidized mixture of the cracking catalyst and cracked feedstock leaves a vertically-disposed reactor section and enters a cyclone separator, placed in a separate stripper vessel, through a conduit. The conduit contains an annulus which allows an inert stripping gas and associated stripped vapors to pass into the cyclone separator.

Anderson, et al., U.S. Pat. No. 4,043,899, disclose a method for rapid separation of a product suspension comprising fluidized catalyst particles and the vaporous hydrocarbon product phase by discharging the entire suspension directly from the riser conversion zone into a cyclonic separation zone which provides cyclonic stripping of the catalyst after it is separated from the hydrocarbon vapors. In the method of Anderson et al., the cyclone separator is modified to include an additional downwardly extending section comprising a lower cyclone stage. In this arrangement, catalyst separated from the gasiform material in the upper stage slides along a downwardly sloping baffle to the lower cyclone where stripping steam is introduced to further separate entrained hydrocarbon products from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gasiform phase and stripping steam pass through the cyclone separator, which means that this equipment must be designed to efficiently handle not only a large vapor volume but also a large quantity of solid particles.

Myers et al., U.S. Pat. No. 4,070,159, provide a separation means whereby the bulk of the solids is discharged directly into the settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from but near the discharge end of the riser conversion zone. A deflector cone mounted directy above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracked hydrocarbon products so that the catalyst passes through the dipleg of the cyclone to the body of the catalyst in the lower section of the disengaging vessel and the vaporous phase is directed from this vessel to a conventional fractionation unit. There is essentially no net flow of gases within the disengaging vessel beyond that resulting from a moderate amount of steam introduced to strip the catalyst residing in the bottom of the disengaging vessel.

Haddad et al., U.S. Pat. No. 4,219,407, the entire contents of which are incorporated herein by reference, disclose the separation of the catalyst from the gasiform cracked products in a fashion which permits effective steam stripping of the catalyst. The suspension of catalyst and gasiform material is discharged from the riser conversion zone outwardly through radially extending passageways, or arms, which terminate in a downward direction. Catalyst stripping zones, or strippers, are located beneath the terminus of each of the radially extending passageways. Each stripper consists of a vertical chamber open at the top and the bottom with downwardly sloping baffles located within the chamber so as to cause the catalyst to flow in a circuitous manner countercurrently to upwardly flowing stripping steam introduced at the lower end of the stripping chamber. The radially extending arms are each provided with a curved inner surface and confining sidewalls to impart a cyclonic concentration of catalyst particles promoting a forced separation thereof from the hydrocarbon vapors. The separation of the catalyst from the vapors is basically achieved through rapid changes in the direction of flow of the catalyst and the vapors. Thus the cyclonic collection and concentration of catalyst particles is used to reverse the flow of separated catalyst such that it is concentrated as a downwardly confined stream which discharges generally downwardly and into the open upper end of the catalyst stripping chamber. A vapor disengaging space is provided between the discharge end of the radially extending arms and the top of the catalyst strippers to promote the rapid removal of separated vapors from the catalyst. The separated vapors pass upwardly through the disengaging vessel to the open inlet of a cyclone separator which removes entrained catalyst from the gasiform material for return through a dipleg to the body of steam stripped catalyst while the separated vaporous material passes to a fractionation unit. The hydrocarbon product, as it passes within the disengaging vessel from the discharge of the radially extending arms to the cyclone separator, travels in a random fashion and is exposed to catalytic reaction temperatures which may cause undesirable side reactions and thermal cracking before these vapors enter a quench zone in the main fractionator of the fluid cracking unit.

Haddad et al., allowed U.S. patent application, Ser. No. 400,843, filed July 22, 1982, disclose an FCC reactor comprising a riser with radially extending sidearms as the first catalyst-hydrocarbon separation means. The sidearms force the suspension of the catalyst and the hydrocarbons to suddenly change the direction of flow from the vertical to the horizontal thereby forcing preliminary separation of the gaseous hydrocarbons from the solid catalyst particles. The catalyst particles fall in a downward direction, to a stripping means, while the hydrocarbons, with some entrained catalyst particles, proceed to a secondary separation means, such as a cyclone. The sidearms and the secondary separation means are enclosed by a vertical conduit to prevent random uncontrolled thermal cracking of the hydrocarbons. However, no means are provided in the apparatus and process of this Haddad et al. patent application for accommodating a sudden increase in pressure and the accompanying sudden increased rate of flow of the catalyst. Such unexpected increased pressure and the rate of flow of the cracking catalyst may be caused, for example, by mechanical malfunctions of equipment or by the vaporization of liquid water which may be introduced into the riser bottom with the hydrocarbon feed, or by unit pressure upsets.

It is a primary object of this invention to provide an improved process and apparatus for rapidly separating cracking catalyst from gasiform material and to provide an effective means of improving the ability of the FCC system to tolerate sudden system pressure increases and the accompanying surges in the catalyst rate of flow.

It is another object of this invention to provide an improved means for separating cracking catalyst from gasiform material in a fluid catalytic cracking (FCC) process.

It is a further object of this invention to provide a process and an apparatus for separating cracking catalyst from gasiform material whereby the length of time the gasiform material is subjected to high temperature after separation from the bulk of the catalyst is minimized so as to reduce non-selective thermal cracking of the vapor products.

SUMMARY OF THE INVENTION

An FCC process and apparatus comprising a closed cyclone system for separating the catalyst from cracked hydrocarbon feed after the mixture of catalyst and feed exits the FCC cracking zone, e.g., FCC riser, is equipped with a means for providing a surge capacity to accommodate a sudden increased rate of flow of the catalyst stream. The closed cyclone system of the present invention comprises a primary cyclone means and a secondary cyclone means, or primary and secondary cyclones. The primary cyclone is connected to the FCC cracking zone by an enclosed conduit. The secondary cyclone is placed in-series with the primary cyclone, and the outlet of the primary cyclone is also connected by an enclosed conduit with the inlet of the secondary cyclone. The enclosed conduits limit the exposure of the cracked hydrocarbons to the high temperatures of the FCC reactor, thereby expediting the transfer of cracked hydrocarbons to the secondary cyclone means and preventing undesirable post-riser thermal cracking of the hydrocarbons. The solid catalyst particles are separated as a catalyst stream from the hydrocarbon vapors in the two cyclone separation means. Most of the catalyst stream from the cyclones is then directed to a disengaging zone, e.g., a steam stripper, placed below the cyclones, and the hydrocarbon product is directed to a downstream fractionation means. The surge capacity means is provided in the enclosed conduit connecting the riser with the primary cyclone, in the enclosed conduit connecting the primary with the secondary cyclone, or in both, the enclosed conduits connecting the riser with the primary cyclone and the primary with the secondary cyclones.

BRIEF DESCRIPTION OF THE FIGURES

FIG. 1 is a schematic representation of a side view of a fluid catalytic cracking (FCC) reactor of the present invention.

FIG. 2 is the front view of the FCC reactor of the present invention, taken along the axis A—A of FIG. 1.

DETAILED DESCRIPTION OF THE INVENTION

The means for providing surge capacity to accommodate the sudden increased pressure and the sudden increased rate of flow of the catalyst stream can be, for example, a trickle valve which is positioned in one or both of the aforementioned enclosed conduits (e.g., see FIG. 1). The trickle valve, or any other surge capacity means, is usually held closed by the higher pressure outside of the enclosed conduit than on the inside thereof. However, during the upset or surge conditions, the pressure inside the conduit exceeds that on the outside thereof forcing the surge capacity means to open and vent the excess material into the large reactor vessel surrounding the cyclones and the enclosed conduit. Therefore, in the event of a sudden unexpected surge of increased pressure and of the increased catalyst volume flow, the surge capacity means allows excess catalyst and hydrocarbon gases to exit the conduit, and the excess catalyst is deposited in the bottom of the reactor vessel. The provision of the surge capacity means prevents the primary and secondary cyclone dipleg flooding and large catalyst carryover from the FCC reactor to the main fractionation column, both of which might occur without the surge capacity means in the event of the surge conditions. In this connection, the term increased rate of catalyst flow, as used herein and in the appended claims, designates a short term 2 to 20-fold increase of catalyst flow by volume per unit of time of the steady state rate of flow of the catalyst stream. Similarly, the term sudden increase in pressure designates the pressure increase inside the enclosed conduit of 2–10 psi, as compared to the steady state operating conditions. In a conduit connecting the riser of the FCC reactor and the primary cyclone, there is provided a means, e.g., a slotted opening, to provide an opportunity for the major portion of the stripping steam and stripped hydrocarbon mixtures to enter the inside of the conduit and therefore of the primary and secondary cyclones. Another portion of the stripping steam and stripped hydrocarbons leaves the stripper through a conduit carrying spent catalyst to the regenerator. The bottom of the surge capacity means may be elevated, for example, by providing a serrated edge spacer in the wall of the conduit which supports the bottom of the surge capacity means in a spaced relationship with respect to the conduit and allows for the remaining portion of the stripping steam and stripped hydrocarbons to enter the enclosure.

The invention will now be described in connection with one specific embodiment thereof illustrated in FIGS. 1 and 2. This embodiment, however, is not to be construed as a limitation on the scope of the invention. Referring to FIG. 1, a reactor vessel 2 is provided with a catalyst stripping section 4 in a lower bottom portion of the vessel. The vessel 2 surrounds the terminal end of a riser conversion zone 6, to which are attached primary cyclone separating means 8 and 12, and secondary cyclones separating means 10 and 14, respectively. The primary cyclone separating means, or cyclones, 8 and 12 are attached by conduits 16 and 36, respectively, to the outlet of the riser conversion zone, or riser 6. The outlet of the primary cyclones 8 and 12 is attached to the secondary cyclones 10 and 14 by conduits 24 and 42, respectively, through a conventional expansion means, not shown in the drawings. It will be apparent to those skilled in the art that although only two pairs of the primary and secondary cyclones are shown in the embodiment of FIG. 1, more than two pairs of the primary and secondary cyclones and/or more than two consecutive cyclone stages may be used in a commercial installation without impairing the operation of the apparatus and the process of the present invention. Cyclone separators 8 and 12 attached to the discharge end of riser 6 by conduit means 16 and 36 are provided with catalyst diplegs 18 and 40, provided with trickle valves 20 and 48 on the bottom discharge end thereof. Openings 22 and 38 are provided in conduits 16 and 36 to allow steam and/or hydrocarbon gases to enter conduits 16 and 36. Gasiform material separated in cyclones 8 and 12 passes through conduits 24 and 42 to secondary cyclones 10 and 14, wherein a further separation of catalyst fines from gaseous material is carried out. Separated catalyst is withdrawn by diplegs 26 and 44 from the secondary cyclones, and a gasiform material is passed from cyclones 10 and 14 by conduits 28 and 50 to a plenum chamber 30 for removal by conduit 32 and passage to a downstream fractionation equipment, not shown for clarity. The secondary cyclones 10 and 14 are provided with diplegs 26 and 44, which are provided with trickle valves 34 and 46 at the bottom end thereof.

The conduits 24 and 42 are provided with trickle valves 27 and 41, respectively, for accommodating sudden unexpected surges of increased pressure and of catalyst flow rate originating from operational or mechanical upsets. Alternatively, only conduits 16 and 36 may be provided with trickle valves 27A and 41A, respectively, to accommodate the increased pressure and catalyst flow rate surges. In yet another embodiment, conduits 16, 24, 36 and 42 are provided with trickle valves 27A, 27, 41A and 41, respectively, as shown in FIG. 1, to accommodate the increased pressure and catalyst flow rate surges. FIG. 2 illustrates the detail of the valve 41, and it will be apparent to those skilled in the art that the valves 27, 27A and 41A are constructed and operated in the manner identical to that of valve 41. Referring to FIG. 2, the gate 39 of the valve 41 is attached by a ring-hinge 43 to the conduit 42, thereby allowing the valve 41 to open in response to an increased pressure within the conduit 42. To open the valve 41, the pressure within the conduit 42 must exceed the pressure within the vessel 2 surrounding the conduit 42, and therefore the valve 41. Under normal operating conditions, the pressure within the conduit 42 does not exceed the pressure within vessel 2, and therefore the valve 41 remains closed. However, during sudden unexpected surges of flow of the catalyst and hydrocarbon suspension, or during unexpected pressure increases, as defined above, pressure within the conduit 42 exceeds that in vessel 2 and forces valve 41 to open which allows the suddenly increased volume of the suspension to exit the conduit 42 through the opening and eliminate the excess material from the system. In the absence of the valve 41, an unexpected increased surge of the suspension flow may cause entrainment of a large proportion of catalyst within the cracked hydrocarbon stream, which, in turn, may cause excessive catalyst carryover to the FCC main fractionation column or damage to the internal apparatus of the fractionation column. The valve 41, or other surge capacity means, is sized to accommodate surges of up to 20 times of the steady state rate of catalyst flow. The bottom portion of valve plate 39 leans against the serrated edge 39A of the horizontal plate protruding from conduit 42. The serrated edge permits the stripping steam to enter conduit 42, thus preventing coke build-up on the edge of plate 39A which could partially or totally seal the valve 39.

The catalyst separated in diplegs 18, 26, 40 and 44 is discharged from the diplegs after a suitable pressure is generated within the diplegs by the buildup of the catalyst, and it falls into a bed of catalyst 52 therebelow. The bed 52 is contacted with a stream of gas, such as steam, flowing countercurrently to the direction of flow of the catalyst. The gas is introduced into the lower bottom portion of the stripping section 4 by one or more conduits 54 and 56. Stripped catalyst is removed by a conduit 58 for passage to a catalyst regeneration zone or a second stage of hydrocarbon conversion zone, depending upon the activity and the amount of carbonaceous material, or coke, deposited on the catalyst particles.

The principal purpose of the enclosed conduits 36 and 42 is to provide a direct controlled passage of the cracked vapors from the riser reactor to the primary and secondary cyclones, and therefore to limit the time the cracked vapors are exposed to elevated cracking temperatures. Otherwise, the cracked vapors would pass randomly through the upper portion of vessel 2 to the cyclone separating means. This would provide additional opportunity for non-selective thermal cracking of the hydrocarbons, thereby lowering the product yield. By providing a direct enclosed path for the vapors to be transported out of the elevated temperature zone, there is provided an opportunity for the vapors to be quenched and fractionated in a controlled manner in the main fractionator of the processing unit, thereby limiting undesirable thermal overcracking. Thus, in accordance with the present invention, the separation of catalyst from carbonaceous materials is achieved efficiently, while, at the same time, the length of time that the gaseous materials are subjected to high cracking reaction temperatures after separation from the catalysts is minimized. The direct connection between the primary and secondary cyclones provided by the enclosed conduits 16, 24, 36 and 42 is principally responsible for the reduction in thermal post-riser cracking. It will be apparent to those skilled in the art, that more than one surge capacity means, such as trickle valves 27, 27A, 41 and 41A, may be provided in the enclosed conduits 24, 16, 42 and 36, respectively.

In the method and apparatus of the present invention, a higher pressure is maintained outside of the primary cyclone than on the inside thereof. This causes a seal of catalyst to build up in the dipleg to a selected height depending on the pressure imposed on the system. The seal of catalyst in the dipleg substantially prevents the flow of gasiform material into the dipleg. In contrast, in conventional prior art designs, the pressure inside the primary cyclone was maintained higher than the pressure outside of the cyclone. As a result, the gasiform hydrocarbon product had an opportunity to remain in contact with the catalyst for a longer time by being drawn down into the cyclone dipleg. In the process and apparatus of the present invention, the hydrocarbons exiting the primary cyclone enter the secondary cyclone directly through the conduits 24 and 42, respectively, and in the presence of a reduced amount of catalyst. In addition, the stripping steam and stripped hydrocarbons are generally at a lower temperature than the suspension of catalyst and cracked hydrocarbons passed to the primary cyclone, and the admixture of this lower temperature stripping steam and hydrocarbons in the primary and/or secondary cyclones considerably reduces overcracking and improves the separation of hydrocarbon vapors from catalyst particles in the suspension entering the cyclone.

In another embodiment of the invention, one or more of the primary cyclones, such as 8 and 12 as shown in FIG. 1, may be modified to incorporate the stripping arrangement of the stripper cyclone of U.S. Pat. No. 4,043,899, the entire contents of which are incorporated herein by reference. The employment of the stripper cyclone instead of the conventional primary cyclone shown in FIG. 1 renders the operation even more effective for accomplishing the results desired insofar as hydrocarbon vapors flowing downwardly in the dipleg, in the interstitial volume between the catalyst particles, can be displaced by the stripping steam supplied to the stripper cyclone.

In one specific embodiment of the present invention, the process is conducted in such a manner that the pressure at the top of the riser reactor conduit is about 31.4 pounds per square inch gauge (psig); the pressure within the reactor vessel 2 and outside of the riser is about 31.4 (psig); the pressure within the first stage cyclone is about 30.5 psig; the pressure within the second stage cyclone is about 29.3 psig; and the pressure in the plenum chamber 30 is about 28.8 psig. Under these pressure operating conditions, it is estimated that the second stage cyclone dipleg will develop a catalyst seal in the dipleg of approximately 10 feet and a catalyst seal in the primary cyclone will be about 4.3 feet.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for the fluid catalytic cracking of a hydrocarbon feed, comprising the following steps:
   passing a suspension of hydrocarbon feed and catalyst through a riser conversion zone under cracking conditions to produce a mixture of cracked hydrocarbon product and catalyst;
   passing said mixture from said riser conversion zone through a first conduit to a primary cyclone and, subsequently, through a second conduit to a secondary cyclone, said first conduit containing a first surge capacity means for accommodating a sudden 2- to 20-fold increase above a steady state rate of flow of said mixture;
   substantially completely separating the catalyst from the cracked hydrocarbons in said primary and secondary cyclones; and
   passing said separated catalyst to a catalyst stripping zone wherein entrained hydrocarbons are removed from said separated catalyst.

2. The process of claim 1, wherein said riser conversion zone, said primary and secondary cyclones, and said catalyst stripping zone are housed within a fluid catalytic cracking reactor vessel.

3. The process of claim 2, wherein said catalyst separated in said primary and said secondary cyclones passes downwardly through a first dipleg and a second dipleg, associated with said primary and secondary cyclones, respectively, to said catalyst stripping zone.

4. The process of claim 3, further comprising passing a first portion of gases from said catalyst stripping zone into said first conduit through said first surge capacity means.

5. The process of claim 4, further comprising passing a second portion of gases from said catalyst stripping zone into said first conduit through a portion in said first conduit through a port in said first conduit.

6. The process of claim 5, wherein said second conduit contains a second surge capacity means for accommodating a sudden 2- to 20-fold increase above a steady state rate of flow of said mixture.

7. The process of claim 6, wherein said first and second surge capacity means each comprise an opening covered by a trickle valve.

8. The process of claim 7, wherein said primary cyclone is a stripper cyclone and said separation of said catalyst from said mixture comprises passing said mixture from said riser conversion zone into a cyclonic separation zone wherein a first cyclonic separation is carried out between said fluid catalyst particles and cracked hydrocarbon product;
passing said catalyst particles thus separated substantially immediately into a lower separate portion of said stripper cyclone through an opening into an annular zone wherein it is contacted with a tangentially introduced stripping gas;
passing said stripping gas and stripped products separated from said catalyst into the annular zone upwardly through an open end restricted passageway concentric with said annular zone and in open communication with an upper withdrawal passageway for removing cracked hydrocarbon product from an upper portion of said stripper cyclone into said second conduit; and
conducting said catalyst particles from said stripper cyclone into said stripping zone.

9. A process for the fluid catalytic cracking of a hydrocarbon feed, comprising the following steps:
passing a suspension of hydrocarbon feed and catalyst through a riser conversion zone under cracking conditions to produce a mixture of cracked hydrocarbon product and catalyst;
passing said mixture from said riser conversion zone through a first conduit to a primary cyclone and, subsequently, through a second conduit to a secondary cyclone, said second conduit containing a surge capacity means for accommodating a sudden 2- to 20-fold increase above a steady state rate of flow of said mixture;
substantially completely separating said catalyst from said cracked hydrocarbons in said primary and secondary cyclones; and
passing said separated catalyst to a catalyst stripping zone wherein entrained hydrocarbons are removed from said separated catalyst.

10. A process for the fluid catalytic cracking of a hydrocarbon feed in a closed cyclone system, comprising the following steps:
passing a suspension of hydrocarbon feed and a catalyst into an upstream end of a riser conversion zone defined by a vertically disposed elongated tubular conduit and discharging a mixture of the catalyst and cracked hydrocarbon product from a downstream end of said riser, wherein said downstream end terminates within a reactor vessel;
passing said discharged mixture through a first conduit to a primary cyclone connected to said downstream end and subsequently passing said mixture through a second conduit to a secondary cyclone;
providing said first conduit with a first surge capacity means for accommodating a sudden 2- to 20-fold increase above a steady state rate of flow of said mixture within said first conduit, said first surge capacity means being substantially closed during a steady state rate of flow of said mixture within said first conduit, wherein said first surge capacity means prevents catalyst flow therethrough when said first surge capacity means is substantially closed and passes a first portion of stripping gas therethrough when said first surge capacity means is substantially closed;
passing a portion of said catalyst from said cyclones to a catalyst stripping zone; and
stripping entrained hydrocarbons from said portion of catalyst in said stripping zone.

11. The process of claim 10, wherein said portion of catalyst passes downwardly from said primary and secondary cyclones to said stripping zone.

12. The process of claim 11, wherein a second portion of stripping gas passes from said catalyst stripping zone into said first conduit through means defining a port in said first conduit.

13. The process of claim 12, wherein said portion of catalyst passes through a first and a second dipleg, associated with said primary and secondary cyclones, respectively, to said stripping zone.

14. The process of claim 13, wherein said primary cyclone is a stripper cyclone and said catalyst is separated from said mixture by passing said mixture from said riser conversion zone into a cyclonic separation zone of said stripper cyclone, wherein said catalyst is cyclonically separated from said cracked hydrocarbon product;
substantially immediately passing the thus-separated catalyst into a lower separate portion of said stripper cyclone through an opening into an annular zone wherein it contacts with a tangentially introduced stripping gas;
separating said stripping gas and stripped products from said catalyst in said annular zone upwardly through an open ended restricted passageway concentric with said annular zone and in open communication with an upper withdrawal passageway for removing cracked hydrocarbon product from the upper portion of said stripper cyclone into said second conduit; and
conducting said catalyst from said stripper cyclone into said stripping zone.

15. The process of claim 10, wherein said first surge capacity means comprises an opening in said first conduit wherein a trickle valve prevents said catalyst flow therethrough by covering said opening when said first surge capacity means is substantially closed.

16. The process of claim 15, wherein a top portion of said trickle valve pivots about a trickle valve axis which is substantially perpendicular to the axis of said riser conversion zone.

17. The process of claim 16, wherein said first portion of stripping gas passes into said first conduit through means for horizontally elevating a bottom portion of said trickle valve with respect to said first conduit when said trickle valve is substantially closed.

18. The process of claim 17, wherein said means for elevating comprises a serrated edge attached to said first conduit.

19. The process of claim 18, wherein said trickle valve further comprises a bottom portion which contacts said serrated edge when said valve is substantially closed.

20. The process of claim 17, wherein a pressure in said reactor vessel is higher than in the primary cyclone thereby facilitating operation of said first surge capacity means.

21. The process of claim 18, further comprising providing a second surge capacity means, located in said second conduit, for accommodating a 2- to 20-fold sudden increase of the steady state rate of flow of said mixture within said second conduit, said second surge capacity means being substantially closed during a normal rate of flow of said mixture within said second conduit, wherein said second surge capacity means prevents catalyst flow therethrough when said second surge capacity means is substantially closed and allows stripping gas flow therethrough when said second surge capacity means is substantially closed.

22. A process for the fluid catalytic cracking of a hydrocarbon feed in a closed cyclone system, comprising the following steps:

introducing a suspension of hydrocarbon feed and catalyst into a riser conversion zone defined by a vertically disposed elongated tubular conduit having an upstream end and a downstream end, said downstream end terminating within a reactor vessel;

discharging a mixture of the catalyst and cracked hydrocarbon product from the downstream end thereof;

passing said discharged mixture through a first conduit to a primary cyclone, wherein said first conduit is attached to said downstream end and said primary cyclone;

passing said mixture from said primary cyclone to a secondary cyclone connected to said primary cyclone by a second conduit, said first and second conduits completely separating said mixture conducted therein from the atmosphere of said reactor vessel;

providing said second conduit with a surge capacity means for accommodating a sudden 2- to 20-fold increase above a steady state rate of flow of said mixture within said second conduit, said surge means being substantially closed during a steady state rate of flow of said material within said second conduit, said second surge means preventing catalyst flow therethrough when said second surge means is substantially closed and allowing stripping gas flow therethrough when said second surge means is substantially closed;

passing a portion of said catalyst from said cyclones to a catalyst stripping zone; and stripping entrained hydrocarbons from said portion of catalyst in said catalyst stripping zone.

* * * * *